United States Patent [19]
LoPresti

[11] Patent Number: 4,815,318
[45] Date of Patent: Mar. 28, 1989

[54] BEARING-LESS POSITIVE DISPLACEMENT FLOW METER

[76] Inventor: William J. LoPresti, 15935 Notting Hill Dr., Lutz, Fla. 33549

[21] Appl. No.: 9,736

[22] Filed: Feb. 2, 1987

Related U.S. Application Data

[63] Continuation-in-part of Ser. No. 719,418, Apr. 3, 1985, Pat. No. 4,641,522.

[51] Int. Cl.⁴ ............................................. G01F 3/10
[52] U.S. Cl. .................................................... 73/261
[58] Field of Search ............... 73/253, 261; 417/420, 417/206

[56] References Cited

U.S. PATENT DOCUMENTS

| | | | |
|---|---|---|---|
| 294,026 | 2/1884 | Fitts | 73/261 |
| 386,795 | 7/1888 | Ball | 73/261 |
| 1,996,672 | 4/1935 | Busch | 73/261 |
| 2,368,019 | 1/1945 | Guibert et al. | 73/261 X |
| 2,383,226 | 8/1945 | Swindle | 73/261 |
| 3,827,297 | 8/1974 | Griverus | 73/253 |
| 4,489,615 | 12/1984 | Ward | 73/261 |
| 4,579,008 | 4/1986 | Bohm et al. | 73/261 |
| 4,641,322 | 2/1987 | LoPresti | 73/261 |

FOREIGN PATENT DOCUMENTS

| | | | |
|---|---|---|---|
| 862521 | 1/1953 | Fed. Rep. of Germany | 73/261 |
| 0087914 | 7/1980 | Japan | 73/261 |
| 0141619 | 11/1980 | Japan | 73/261 |
| 0184514 | 10/1983 | Japan | 73/253 |

Primary Examiner—Herbert Goldstein
Attorney, Agent, or Firm—James Creighton Wray

[57] ABSTRACT

A bearing-less positive displacement flowmeter is disclosed of the type having dual rotary pistons with inter-engaging blades. Bearing-less mounting of the rotary pistons is established by making the pistons out of sleeve bearing material and having them rotate about stainless steel shafts. The pistons are in tight clearance with the casing. Magnets on the piston blades interrupt the magnetic field of the front outside mounted pickup. The interrupted field results in a pulse, the frequency of which is a function of the RPM's of the pistons. Thus, the frequency is directly proportional to the flow rate.

7 Claims, 4 Drawing Sheets

BEARING-LESS POSITIVE DISPLACEMENT FLOW METER

This is a continuation-in-part of application Ser. No. 719,418, filed Apr. 3, 1985 now U.S. Pat. No. 4,641,522.

BACKGROUND OF THE INVENTION

The invention relates to measuring or testing devices having rotating members, electrical circuits or electrical output means and pickup coils. More in particular, the invention relates to measuring or testing devices having rotary pistons or cylinders which inter-engage.

The background art shows the use of inter-engaging rotary pistons and flow meters, wherein electrical output is created using pickup coils. However, there is a need in this art for less complicated and more accurate measuring devices. U.S. Pat. No. 4,295,369 shows the use of inter-engaging rotary pistons utilizing a magnetic drive to generate the electrical pulse. This patent exemplifies the number of moving parts that is generally necessary to effect an accurate metering. In this example, magnets are used to drive other magnets which rotate a shaft which create a pulse.

Instead of magnets, often the inter-engaging rotary pistons are coupled to gearings which will effect a metering. U.S. Pat. No. 294,026 is one such example.

A need exists within this art for less moving parts and more accurate metering.

The problems enumerated in the foregoing are not intended to be exhaustive, but are rather believed to be among many which may tend to impair the effectiveness of previously known meters. Other noteworthy problems may also exist; however, those presented above should be sufficient to demonstrate that the gear meter systems which apear in the art have not been altogether satisfactory as the need to use smaller rotary piston meters has developed.

Recognizing the need for an improved arrangement for rotary piston flow meters, it would be advantageous to provide rotary members which are mounted without bearings on fixed shafts thus eliminating the need for expensive bearings. Furthermore, it would be advantageous to have a flowmeter with a limited number of moving parts and with no moving parts outside the case using information transmitted by means of the magnetic field's effect on the external pickup.

SUMMARY OF THE INVENTION

The invention is a primary flow sensing device which interfaces with any number of electronics packages that accept an AC sine wave pulse input and provides an analog or digital signal that can be conditioned to yield instantaneous flow rate (gallons per minute) and/or flow totalization (gallons).

In one embodiment, the meter has four major components: the case or housing; the rotors (pair); and the front and rear covers. The housing or casing has an oblong sidewall having an inlet and outlet on opposite sides such that a viscous fluid to be measured may enter the housing on one side and leave the housing on the other side. Front and back covers attached to the sidewall define a measuring chamber. The back cover is adapted to mount on the end face of the casing sidewall with bolts and an O-ring seal for flush mounting. Projecting from the back cover and into the measuring chamber are two spaced stationary shafts preferably constructed of stainless steel. These shafts are structured to rotatably support rotors. For other embodiments, the shafts may be eliminated.

When mounted on the shafts, the rotors have lobes that intermesh in the center of the chamber. Bearings are not necessary since the rotors are fabricated of a good sleeve bearing type material such as ultra high molecular weight (UHMW) polyethylene. The rotors are dimensioned such that when they are mounted on the stationary shafts, they are in continuous engagement with one another and at the same time they are each in a continuous dynamic sealing arrangement with the measuring chamber walls. The measuring chamber walls include inner surfaces of the sidewall, outlet, front cover and back cover. The front cover is connected to the opposite end face of the sidewall in the same manner as the back cover.

Preferably, each lobe of each rotor contains a magnet. A magnetic pickup is mounted on the outside of the front cover in a position that permits it to react to each magnet on each lobe as the lobe passes by on the opposite wet side of the front cover, as the rotors are driven by the flow of fluid.

The liquid enters the inlet nozzle of the casing and spins the rotary pistons, one clockwise and the other counter clockwise, and is carried in the pockets of the rotors, comprising the valleys between each lobe and the inner surface of the case, to the outlet nozzle. The spinning of the lobes causes the magnets mounted therein to pass near the magnetic pickup mounted on the outside of the front cover. This creates an interrupted magnetic field which in turn generates AC voltages or a pulse in the pickup. The frequency of the pulse is a function of the RPM's of the rotors which is directly related to the flow rate.

With tight clearance between the rotor blades and the case, the rotors and the covers, and the case covers bolted to the case with O-ring seals for flush mounting, the meter has very little slippage (virtually zero slippage on high viscosity materials) and has proven to be extremely reliable, accurate, and repeatable.

It is an object of the invention to provide a meter with only two moving parts.

It is another object of the invention to provide a meter having dual interchanging rotors mounted on stationary shafts without the use of bearings.

It is another object of this invention to provide a device which may be easily repaired.

DESCRIPTION OF THE PREFERRED EMBODIMENT

Figure 4:
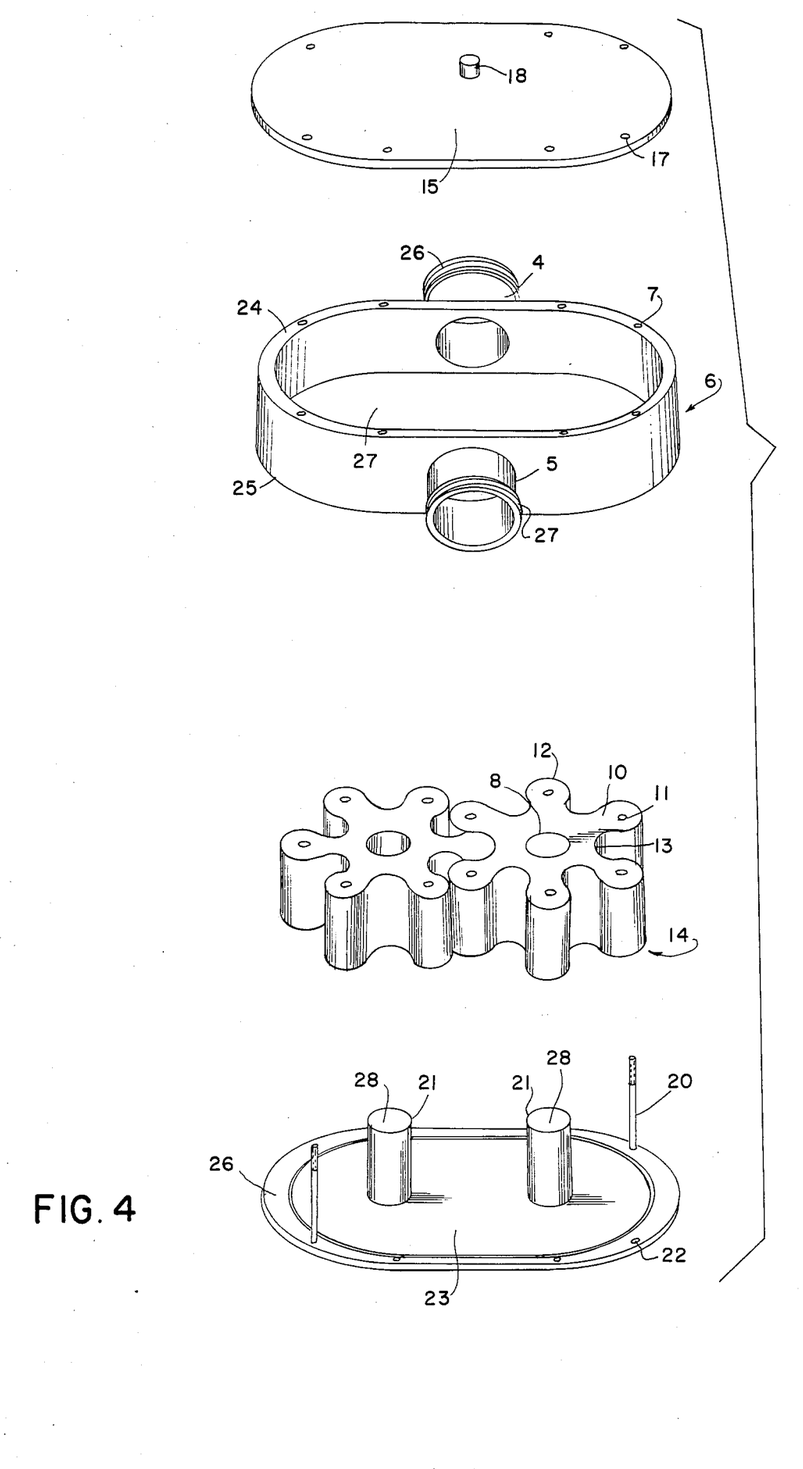
FIG. 4 is an exploded diagram showing the parts of the invention in the order in which they would be assembled.

Referring to FIG. 4, a casing 6 is provided which is a thick oblongated band preferably constructed of stainless steel. Inlet nozzle 5 and outlet nozzle 4 are located on opposite sides of casing 6. A substantial length of those sides are parallel. The nozzles are provided with threads 26, 27 for connecting a fluid conduit (not shown). The casing 6 has opposite edges 24, 25 for attachment of back cover 23 and front cover 15. The covers 23, 15 are attached to the edges by means of bolts 20. Channels or throughbores for receiving the bolts are spaced about the periphery of the covers and casing. The respective throughbores 22, 7 and 17 are vertically aligned to receive the bolts.

Attached to the edge 25 is the back cover 23. An O-ring seal 23A is preferably recessed into cover 23 along periphery 26 prior to bolting to effect a flush mounted leakproof seal.

Stationary shafts 21 project perpendicularly from the plane of the back cover 23 and extend into the measuring chamber 27. It is preferred that the stationary shafts be constructed of stainless steel and be of a length sufficient to span the depth of the measuring chamber so that there is tight clearance between the distal ends 28 of the shafts 21 and the inside or wet side of the front cover 15.

Figure 1:
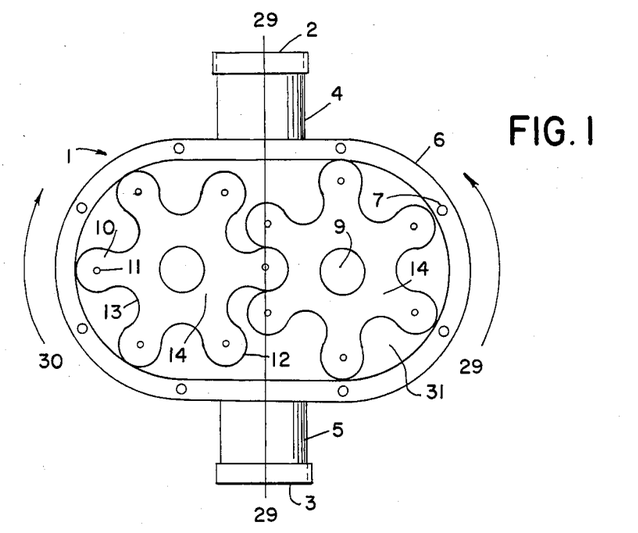
FIG. 1 is a plan view of the invention with the front cover removed.

Rotors 14 are mounted on stationary shafts 21 by insertion of the shaft through central bores 8. Shafts 21 are spaced on back cover 23 to allow for the two rotors to inter-engage as shown in FIG. 1. The rotors have lobes 10, vertices 12, and nadirs 13, defining valleys between the lobes. Magnets 11 are embedded in the lobes 10 near where the blades are in tight clearance with the front cover 15.

As shown in FIG. 1, the lobes intermesh at points along line A—A. The rotor's depth corresponds to the depth of the measuring chamber.

As shown in the embodiment of FIGS. 1-4, the rotors have six lobes. The rotors 14 are adapted to rotate with minimal resistance about stationary shafts 21 without the use of bearings. This is effected by costructing the pistons out of a good sleeve bearing material. A good example of sleeve bearing material is UHMW polyethylene. It is conceivable that just the throughbore 8 be lined with the material in order to effect minimal resistance bearing-less mounting.

Figure 2:
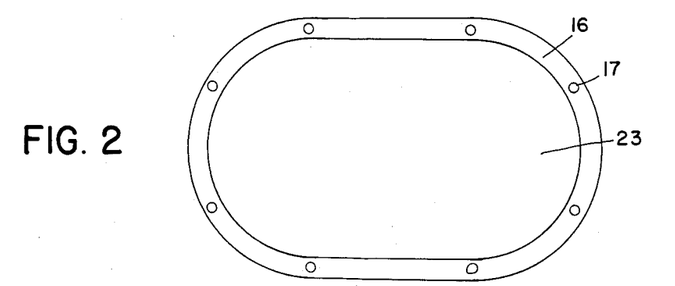
FIG. 2 is a plan view of the inside of the front cover.

Front cover 15 is mounted on casing 6 in the same manner as is the back cover 23. On the outside surface of cover 15 is a magnetic pickup 18. The pickup should be located on the dry side of cover 15 opposite a point on the wet side where magnets 11 rotate.

Figure 3:
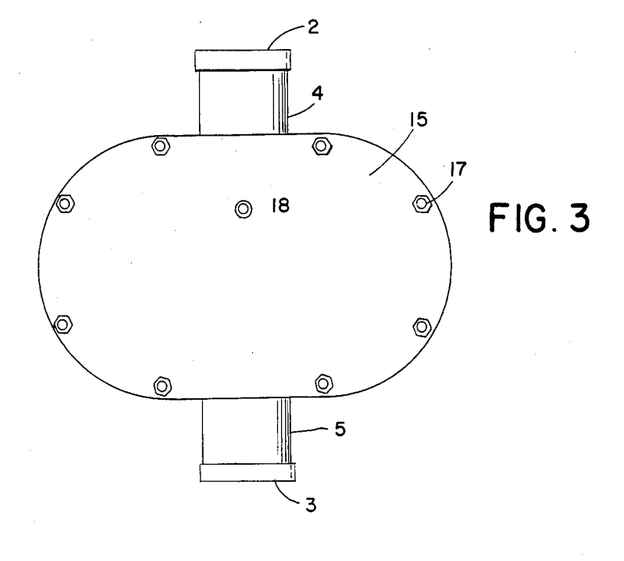
FIG. 3 is a plan view of the fully assembled invention.

FIG. 3 shows the device fully assembled.

Referring now to FIG. 1, the function of the bearingless positive displacement flow meter will now be described. For the sake of illustration, I will refer to nozzle 5 as the inlet nozzle and nozzle 4 as the outlet nozzle. As can be readily seen, the device 1 is symmetrical, making the designation of inlet and outlet arbitrary. Fluid is flowed into nozzle 5 which has a longitudinal bore extending therethrough. Fluid enters the measuring chamber where it seeks a path of least resistance causing the rotors 14 to rotate in the direction indicated by arrows 29 and 30. Since the rotors are in tight clearance with the casing and covers, the fluid fills into the valleys 31. The valleys, rotating with the lobes 10, empty their contents near the outlet nozzle 4. The interengaging pistons further force fluid out near outlet nozzle 4. The outlet nozzle 4 is constructed just like the inlet nozzle 5. There is an end 2 having external threads for threadably engaging fluid conduit means (not shown).

As the rotors 14 rotate about stationary shafts 21, magnets 11 interrupt the magnetic field of pickup 18. The interrupted magnetic field creates an AC voltage or pulse in the pickup, the frequency of which is the function of the RPM's of the rotor which is directly proportional to the flow rate. The pulse may be interfaced with any number of electronics packages that accept an AC sine wave pulse input and provide an analog or digital signal that can be conditioned to yield instantaneous flow rates, e.g., gallons per minute, and/or flow totalization, e.g., gallons. With tight clearance between the lobes and the case, the rotors and the covers and with the case covers bolted to the case with O-ring seals for flush mounting, the meter has very little slippage. There is virtually no slippage on high viscosity materials such as orange concentrate. The meter is extremely reliable, accurate and repeatable. For high accuracy at extremely low flow rates, the magnetic pickup can be replaced with a magnetic reed switch (or electronic switch). Each time a lobe magnet triggers the switch at the common point a counter/totalizer circuit can be activated to provide total flow volume. The Hall Effect Sensor is a good example of a slow revolution counter. It is an electronic magnetic switching device similar to a transistor in that a switching occurs when a magnet is juxtaposed.

The casing, front and back covers may be molded, machined or stamped. Stainless steel is the preferred material. The rotors may be molded using a polyolefin such as UHMW polyethylene or polytetrafluoroethylene. The unit may also be constructed without shafts or at least with reduced shafts. The reduced shafts do not extend all the way through the rotary pistons. It is because of precision metering that the shafts may be reduced or eliminated in their entirety. The reduced shafts are simply a cylindrical protrusion from the cover for the purpose of centering and aligning the rotors.

It should be noted that a wide range of materials may be used in the construction of the invention. It is preferred that the rotors and casing be of different materials to allow for problems such as temperature expansions, etc.

In situations where temperatures are moderate, plastics may be used to construct the casing. Polyvinylchloride and Dupont Product DELRON are suitable materials.

Figure 5:
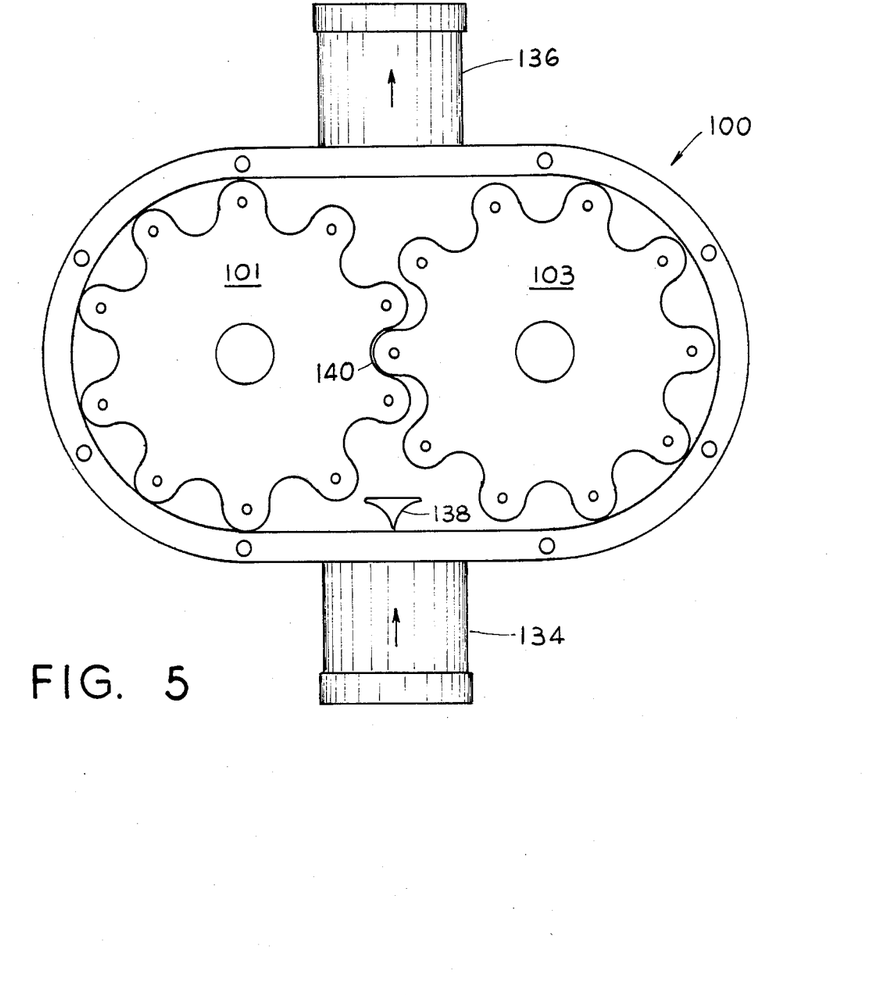
FIG. 5 is a plan view of another embodiment of the invention with the front cover removed.
Figure 6:
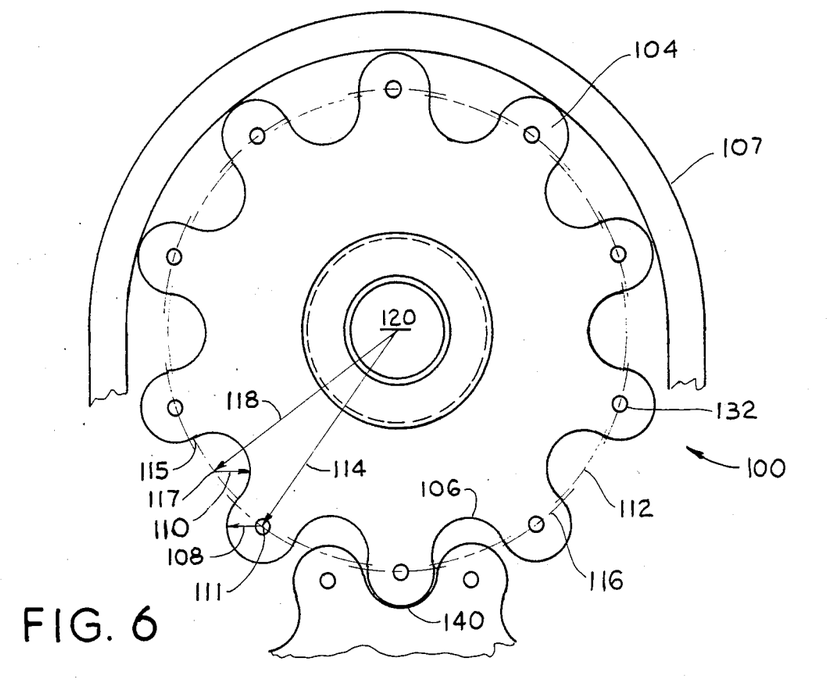
FIG. 6 is a detailed view of a portion of FIG. 5.
Figure 7:
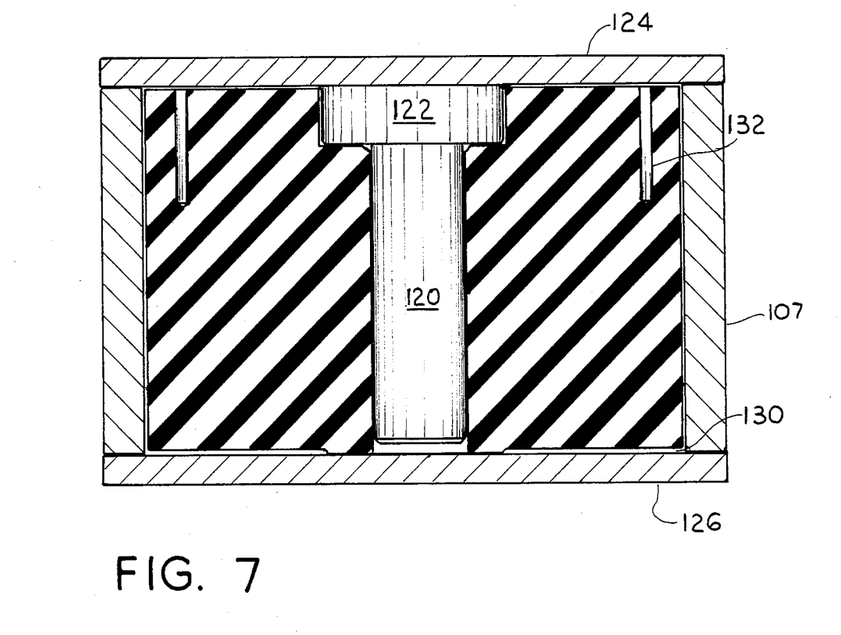
FIG. 7 is a cross sectional view of the FIG. 5 embodiment.

Another embodiment of the invention is shown in FIGS. 5-7.

A flow meter has rotors 101, 103 intrmeshing at the center of a housing. Each rotor has the same characteristics, and FIGS. 6 and 7 could refer to either rotor.

Each rotor has a plurality of radiused lobes 104 separated by radiused valleys 106 which combine to form a circular continuously undulating surface.

The lobe geometry is important to the impeller drive of the rotors. Each lobe has a radius 108 and each valley has a larger radius 110.

Radius 108 is initiated from a point 111 which is the intersection of a vector 114 emanating from the center of the rotor and bisecting the lobe and a circle 116 concentric with the rotor and passing through the center of each magnet 132.

Radius 110 is initiated from a point 117 which is the intersection of a vector 118 emanating from the center of the rotor and bisecting the valley and a circle 112 which has a smaller diameter than circle 116.

The rotors act as impellers that are driven by fluid flow. Rotor geometry would be less critical if timing gears were used to time the relationship between the two rotating impellers. The present invention obviates the need for timing gears by using impeller geometry to create a timing effect. By eliminating timing gears, the invention provides cost effectiveness and greater reliability by eliminating moving parts.

The timing effect is a dynamically induced fluid buffer or boundary layer of metered fluid that tends to develop between the intermeshing lobes. The boundary layer prevents lobe-to-lobe contact and by so doing, reduces frictionally induced wear of the lobes.

The boundary layer 140 appears when the rotors 101 and 103 rotate clockwise and counter-clockwise, respectively, as fluid flows through inlet 134 around the inner walls of the chamber and out the outlet 136. The boundary layer fluid is stationary, e.g., moving neither towards the inlet nor outlet. A diverter 138 may be provided in the incoming flow stream to reduce turbulence by causing a smoother flow directional change towards the proper flow path from inlet to outlet. A lower pressure drop across the meter is achieved. Also, the diverter, in steering the flow along the proper path around the outside of the rotors, produces much more stable rotor rotation and thereby increases overall performance and repeatability.

The diverter 138 can have any suitable shape that deflects fluid flow away from the center and works with the rotor geometry to produce good results without timing gears.

The diverter 138 may be a plate installed in the inlet port of the flow meter for the purpose of removing the horizontal force vector that would otherwise act on the rotors in such a way as to cause a force opposing the required rotation. The plate will reduce or eliminate this force and help reduce the pressure drop across the meter. The diverter 138 further helps prevent channeling through the machining lobes that might occur under certain conditions.

In fact, the boundary layer 140 provides the timing effect since the fluid tends to build up in an even layer between a lobe and a valley at the point of intermeshing. To form the boundary layer, it is necessary to have the radius of the lobe smaller than the radius of the valley.

The main objective is to have a process fluid boundary layer separating physical contact between the two rotors where they mesh together during operation. With fluid viscosities of about 15 centistokes or greater, this can be achieved. At lower viscosities, the boundary layer collapses, causing lobe-to-lobe contact and results in a change in performance characteristics. Even without the boundary layer, the present invention could operate effectively, so long as the rotors are formed of the preferred materials, such as polypropylene, or most preferably ultra height molecular weight (UHMW) polyethylene. A preferred brand of UHMW polyethylene is ULTRAWEAR manufactured by the Polymer Corporation.

Crucial to overall performance characteristics are the zones where rotation and sliding occurs. Previously known flow meters have relied on bearings to relieve frictional forces generated in these zones.

The present invention is "bearingless" in that no conventional bearings are required, so long as the rotors are made of plastics materials with good bearing characteristics, such as low coefficients of friction and wear resistance. In effect, the bores through the center of the rotors act as sleeve bearings for the shaft 120 on which the rotors are mounted for rotation.

Referring to FIG. 7, one end of shaft 120 is provided with an enlarged portion 122 which is connected to and extending upwardly from an inner surface of cover 124. Clearance is provided between the bore and the shaft 120 to facilitate rotation of the rotors.

A countersunk portion of the bore receives the enlarged portion 122 of the shaft. The countersunk portion is not as deep as the enlarged portion is tall; in effect, when the rotor is mounted on the shaft a flat end face of the rotor is spaced from an inner surface of cover 124, thereby preventing contact between the cover and the rotor. Contact is restricted to an area of the end face of the countersunk bore which will rub against an end face of the enlarged portion 122 of shaft 120. Preferably, the inner edge of the bore below the countersunk portion is beveled to facilitate mounting of the rotors.

At the opposite end of the rotor, a raised area of the rotor surrounding the bore prevents contact between a substantial portion of the end face of the rotor and an inner surface of the cover 126. The gap 130 is formed by the abutment of an end face of the rotor with a central portion of the cover 126.

The enlarged portion 122 acts as a shoulder received in a counterbore, wherein the abutting end faces of the enlarged portion 122 and the counterbore act as bearing surfaces. The surface area of the bearing surface is reduced by keeping the full rotor end face from rotating against the cover plate.

Where abrasive liquids and slurries are to be metered, materials with good abrasion resistant properties should be used.

The case 107 is machined to form two large bores, each having a diameter that approximately corresponds to the outermost diameter of the rotors that rotate in the respective bores. Normally, a certain amount of clearance between the inner surface of the casing and the outermost tips of the rotors is necessary for rotation. Similarly, clearance is required between the shaft and the rotor bore. Even though the clearances are minute, the rotors have a natural tendency to move slightly downstream as fluid flows through the meter. Since best results are achieved when the rotors are precisely centered with respect to the shafts and the bore of the case, another embodiment of the invention involves offsetting the bore 107 of the case 107 a small distance towards the discharge 136 or outlet side of the flow meter by machining the bores 107 or otherwise locating the bores towards the downstream side instead of dead center while the fixed shafts 120 remain centered. This permits the rotating rotors to center themselves in the case during operation. The clearance required around the shafts for proper bearing action is obtained by boring the center hole in rotors slightly larger than the diameter of the shaft. For example, the bore may be 0.101 of an inch longer than the shaft. If the offset is not present, the operating rotors might run at zero clearance upstream on the shafts as the force of the fluid flowing through the meter tends to push the rotors toward the discharge side, and consequently they will not ride in the center of the case. Offsetting the bores of the casing by this small amount, for example, 0.005 of an inch, assures correct alignment of the rotors in the case. A similar effect may be achieved by moving the shafts instead of the casing bores.

The elimination of turning gears results from many of the aforementioned features. Preferably, the valley radius is 5–15% larger than the lobe radius, and the length of radius 108 is approximately 15% of the length of the sector 114.

The embodiment shown in FIGS. 5–7 shows magnets 132 implanted in the face of each lobe along the pitch line. A drilled and tapped pocket in the center of the rear cover plate houses a proximity switch which senses the passing magnets and produces an electronic pulsed output signal. This signal is then transmitted to remote instrumentation for data interpretation.

In another embodiment, the cover may be made of high impact resistant clear material such as plexiglass so that operation of the meter can be observed. In this case, a strobe or timing light could be timed to coincide with the speed of the rotors to enable clear viewing of the boundary layer. Also, surges in the pump that pumps fluid through the meter can be detected.

As a result of the combined features of the invention, the flow meter can be washed-in-place, meaning no disassembly is required to clean the pump, by simply running through the meter.

In another embodiment, the clear covers are used in conjunction with photosensors which are capable of distinguishing color differences between the rotor and the magnets or any other objects disposed in the lobes that contrast the color of the rotor. Photo sensors are generally known, but have not been used to meter fluid flow.

It is to be understood that while a specific embodiment has been particularly described, deviations from the preferred embodiment may occur that fall within the ambit of the claims which set out the spirit and scope of my invention.

I claim:

1. A bearing-less positive displacement flow meter apparatus comprising,
   chamber means,
   inlet and outlet means, connected to the chamber means, for communicating fluid through the chamber means,
   first and second cover means, connected to opposite sides of the chamber means,
   rotor means, rotatably mounted in the chamber means, for rotating in response to fluid flowing through the chamber means,
   wherein the rotor means comprises two rotors having rotational axes that lie in a plane perpendicular to a longitudinal axis of the inlet and outlet means,
   mounting means, connected to one of the first and second cover means, for mounting the rotor means,
   spacing means for spacing the rotor means from the first and second cover means,
   signal generating means, connected to the rotor means, for generating a signal that varies in intensity with the speed of rotation of the rotor means, and
   sensing means, disposed adjacent the rotor means, for picking up the signal and indicating a flow rate,
   wherein each rotor has plural lobes, separated by valleys, and
   wherein the signal generating means comprise magnets disposed centrally in each lobe.

2. The apparatus of claim 1 wherein the sensing means comprise a sensor that senses the passing magnets.

3. The apparatus of claim 2 wherein the sensor is a proximity switch that produces an electronic pulsed output signal in response to the passing magnets.

4. A bearing-less positive displacement flow meter apparatus comprising,
   chamber means,
   inlet and outlet means, connected to the chamber means, for communicating fluid through the chamber means,
   first and second cover means, connected to opposite sides of the chamber means,
   rotor means, rotatably mounted in the chamber means, for rotating in response to fluid flowing through the chamber means,
   wherein, the rotor means comprises two rotors having rotational axes that lie in a plane perpendicular to a longitudinal axis of the inlet and outlet means,
   mounting means, connected to one of the first and second cover means, for mounting the rotor means,
   spacing means for spacing the rotor means from the first and second cover means,
   signal generating means, connected to the rotor means, for generating a signal that varies in intensity with the speed of rotation of the rotor means,
   sensing means, disposed adjacent the rotor means, for picking up the signal and indicating a flow rate,
   wherein opposite end faces of the rotors are spaced from inner surfaces of the first and second cover means by the spacing means,
   wherein the spacing means comprises a raised facial surface area adjacent a bore through the rotors at one end and a counterbore adjacent the bore at the opposite end, and
   wherein the mounting means comprises a shaft having an enlarged portion receivable in the counterbore.

5. A bearing-less positive displacement flow meter apparatus comprising,
   chamber means,
   inlet and outlet means, connected to the chamber means, for communicating fluid through the chamber means,
   wherein the first and second cover means comprise first and second covers,
   first and second cover means, connected to opposite sides of the chamber means,
   rotor means, rotatably mounted in the chamber means, for rotating in response to fluid flowing through the chamber means,
   mounting means, connected to one of the first and second cover means, for mounting the rotor means,
   spacing means for spacing the rotor means for the first and second cover means,
   signal generating means, connected to the rotor means, for generating a signal that varies in intensity with the speed of rotation of the rotor means, and
   sensing means, disposed adjacent the rotor means, for picking up the signal and indicating a flow rate,
   wherein the mounting means comprises two shafts connected to an inner surface of one of the first and second covers,
   wherein the rotor means comprises two rotors rotatably mounted on the two shafts,
   wherein the signal generating means comprises magnets disposed centrally in lobes associated with each rotor,
   wherein the rotors intermesh approximately in line between the inlet and outlet means, and
   wherein the sensing means are connected to an outer surface of the cover having the shafts connected thereto at a point where the magnets pass.

6. A bearing-less positive displacement flow meter apparatus comprising, chamber means, inlet and outlet means, connected to the chamber means, for communicating fluid through the chamber means, first and second cover means, connected to opposite sides of the chamber means, rotor means, rotatably mounted in the chamber means, for rotating in response to fluid flowing through the chamber means, wherein, the rotor means comprises two rotors having rotational axes that lie in a plane perpendicular to a longitudinal axis of the inlet and outlet means, mounting means, connected to one of the first and second cover means, for mounting the rotor means, spacing means for spacing the rotor means from the first and second cover means, signal generating means, connecting to the rotor means, for generating a signal that varies in intensity with the speed of rotation of the rotor means, and sensing means, disposed adjacent the rotor means, for picking up the signal and indicating a flow rate, wherein the mounting means comprise two shafts connected to one of the first and second cover means, and wherein the shafts are offset from the center of the chamber by the chamber being formed slightly displaced toward the outlet means from a central position centered on the shafts to compensate for downstream movement of the rotors.

7. A bearing-less positive displacement flow meter apparatus comprising, chamber means, inlet and outlet means, connected to the chamber means, for communicating fluid through the chamber means, first and second cover means, connected to opposite sides of the chamber means, rotor means, rotatably mounted in the chamber means, for rotating in response to fluid flowing through the chamber means, wherein, the rotor means comprises two rotors having rotational axes that lie in a plane perpendicular to a longitudinal axis of the inlet and outlet means, mounting means, connected to one of the first and second cover means, for mounting the rotor means, spacing means for spacing the rotor means from the first and second cover means, signal generating means, connected to the rotor means, for generating a signal that varies in intensity with the speed of rotation of the rotor means, and sensing means, disposed adjacent the rotor means, for picking up the signal and indicating a flow rate, wherein each rotor has plural lobes, separated by valleys, wherein the lobes have radiuses smaller than the radiuses of the valleys, and wherein at an intermeshing area of the two rotors a boundary layer of fluid forms between the lobe of the one rotor and the valley of other to prevent contact therebetween.

* * * * *

REEXAMINATION CERTIFICATE (2719th)
United States Patent [19]
LoPresti

[11] B1 4,815,318
[45] Certificate Issued  Nov. 7, 1995

[54] BEARING-LESS POSITIVE DISPLACEMENT FLOW METER

[75] Inventor: William J. LoPresti, Lutz, Fla.

[73] Assignee: Flowdata, Inc., Richardson, Tex.

Reexamination Research:
No. 90/003,557, Aug. 30, 1994

Reexamination Certificate for:
Patent No.: 4,815,318
Issued: Mar. 28, 1989
Appl. No.: 9,736
Filed: Feb. 2, 1987

Related U.S. Application Data

[63] Continuation-in-part of Ser. No. 719,418, Apr. 3, 1985, Pat. No. 4,641,522.

[51] Int. Cl.$^6$ ............................................. G01F 3/10
[52] U.S. Cl. .................................................. 73/261
[58] Field of Search ............... 73/253, 261; 417/420, 417/206

[56] References Cited

U.S. PATENT DOCUMENTS

| | | |
|---|---|---|
| 2,368,019 | 1/1945 | Guibert et al. ............... 73/261 |
| 3,368,403 | 2/1969 | Granberg ....................... 73/253 |
| 3,531,988 | 2/1969 | Casani et al. ................. 73/187 |
| 3,981,194 | 9/1976 | Blise et al. ................... 73/229 |
| 4,173,144 | 11/1979 | Pounder ......................... 73/229 |
| 4,210,410 | 7/1980 | Ohtani ........................... 418/150 |
| 4,224,015 | 9/1980 | Nagata ........................ 73/261 X |
| 4,329,130 | 5/1982 | Nagata et al. ................ 418/150 |
| 4,409,829 | 10/1983 | Weber ............................ 73/261 |
| 5,275,043 | 1/1994 | Cotton ........................... 73/261 |

FOREIGN PATENT DOCUMENTS

0090017  5/1984  Japan ............................ 73/253

OTHER PUBLICATIONS

Brooks Micro Oval II Flowmeters–Design Specifications, Supported by Declaration of R. Gary Barnes–1977–1984 Collectively Identified as Exhibit "A".

Omega Brochure for FTB–1000 and 1500 Series Oval Gear Positive Displacement Flowmeters Identified as EXHIBIT "B".

AW Company Brochure for ZHM Series Stainless Steel Flow Transmitters, Supported by Declaration of Jack D. Harshman 1980, Identified as EXHIBIT "D".

Publication of Iwao Ohtani entitled New Flow Meter With Four Lobe Helical Rotors, Proceeding of IMEKO Symposium on Flow Measurement and Control in Industry, Tokyo, Japan, Nov. 1979, Identified as EXHIBIT "F".

Testimony of Charles D. Foran before the U.S. District Court for the Southern District of Texas, Houston Division, Cause No. H-90-1554, pp. 1, 7–12, 17, 18, 86 and 87, Identified as Exhibit "L".

Primary Examiner—Richard Chilcot

[57] ABSTRACT

A bearing-less positive displacement flowmeter is disclosed of the type having dual rotary pistons with inter-engaging blades. Bearing-less mounting of the rotary pistons is established by making the pistons out of sleeve bearing material and having them rotate about stainless steel shafts. The pistons are in tight clearance with the casing. Magnets on the piston blades interrupt the magnetic field of the front outside mounted pickup. The interrupted field results in a pulse, the frequency of which is a function of the RPM's of the pistons. Thus, the frequency is directly proportional to the flow rate.

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1–7 is confirmed.

\* \* \* \* \*